No. 798,671. PATENTED SEPT. 5, 1905.
A. C. GILMORE.
AUTOMATIC TELEGRAPH.
APPLICATION FILED MAR. 10, 1903.
10 SHEETS—SHEET 6.
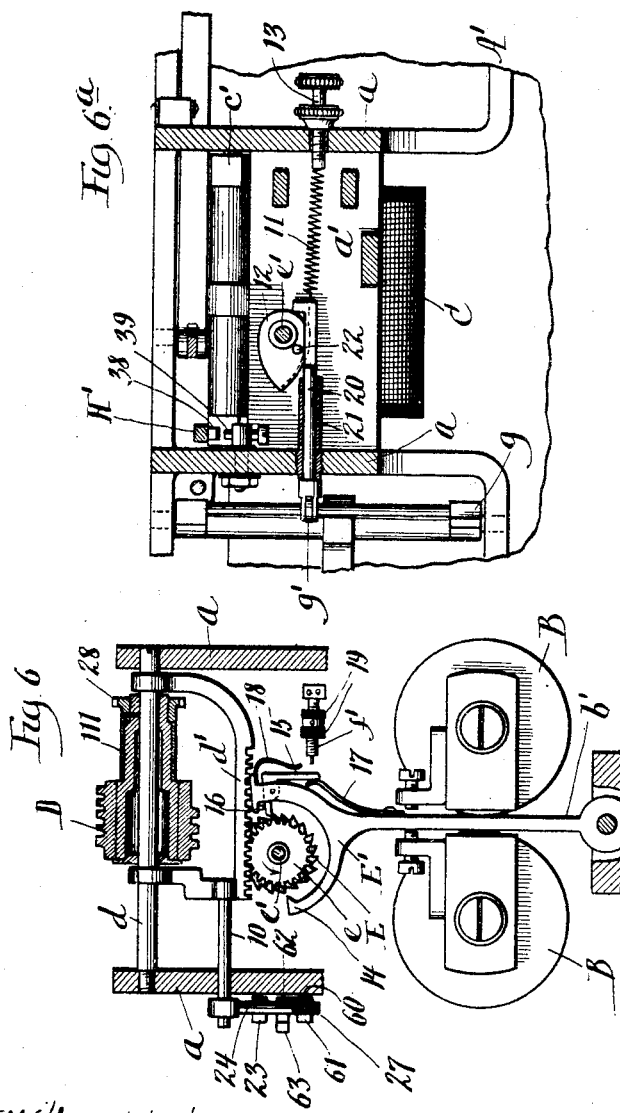
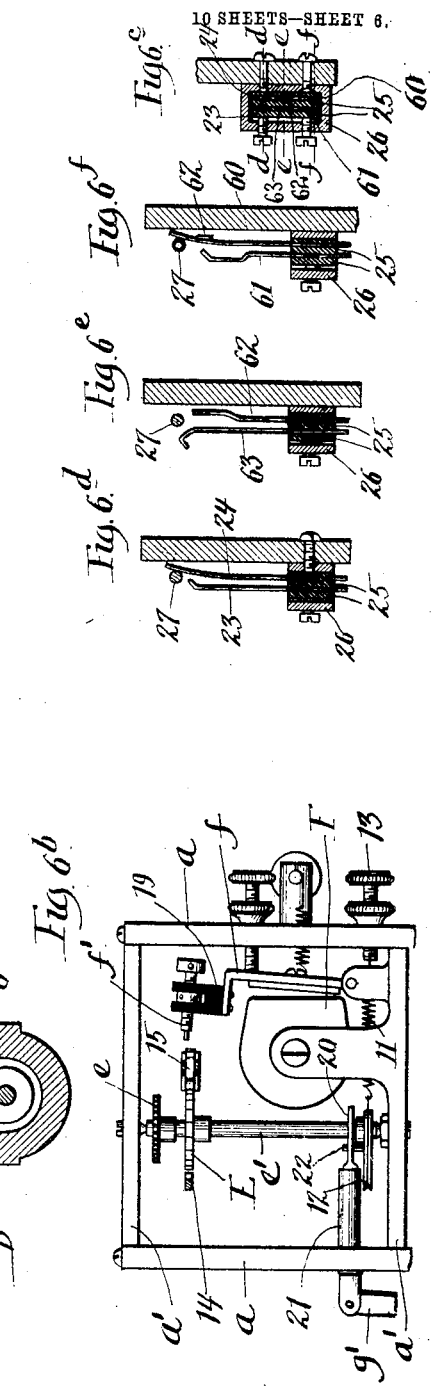
Witnesses:
Fred Gerlach
Harry L. Clapp
Inventor
Alfred C Gilmore
By Peirce & Fisher
his Attorneys.

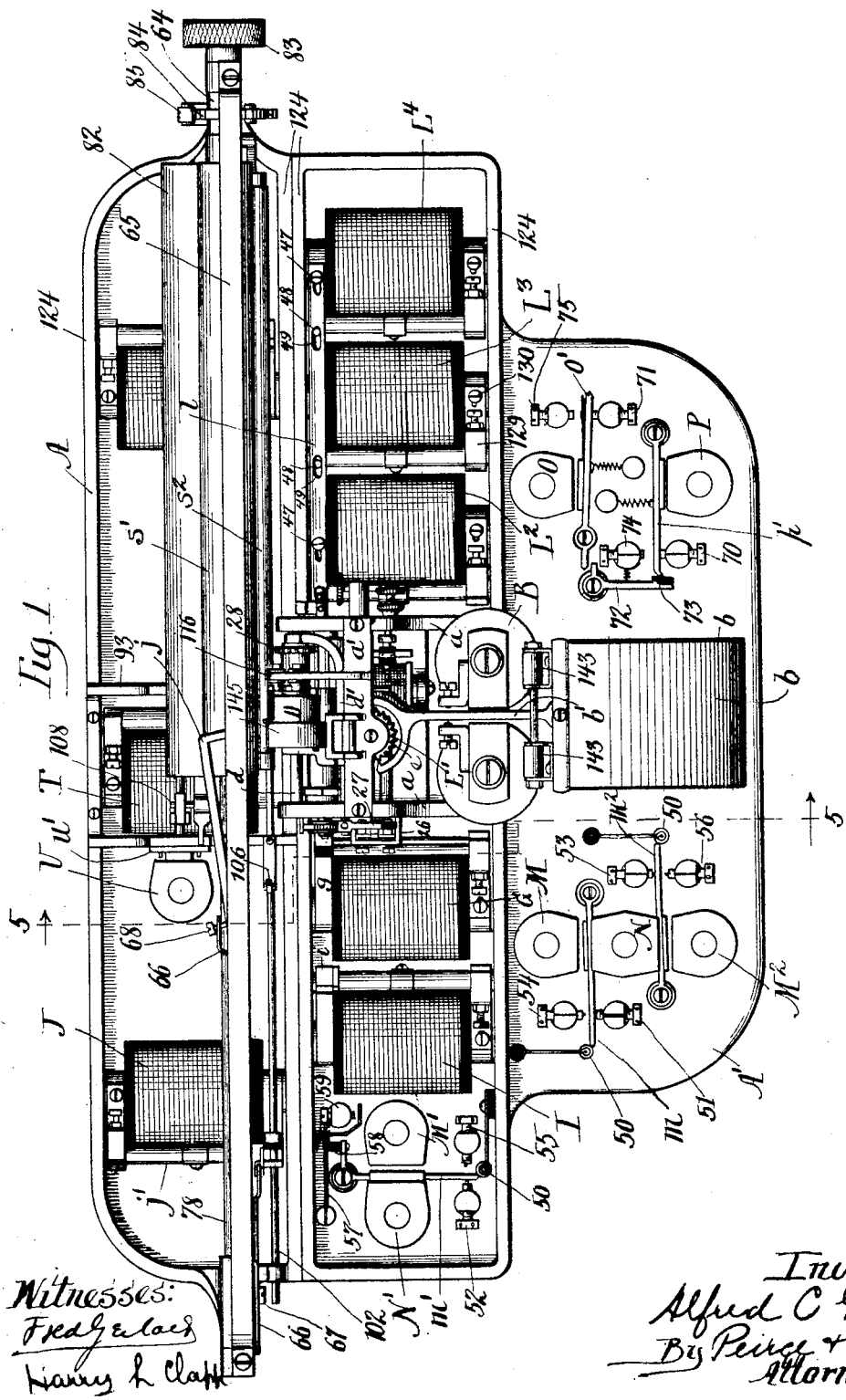

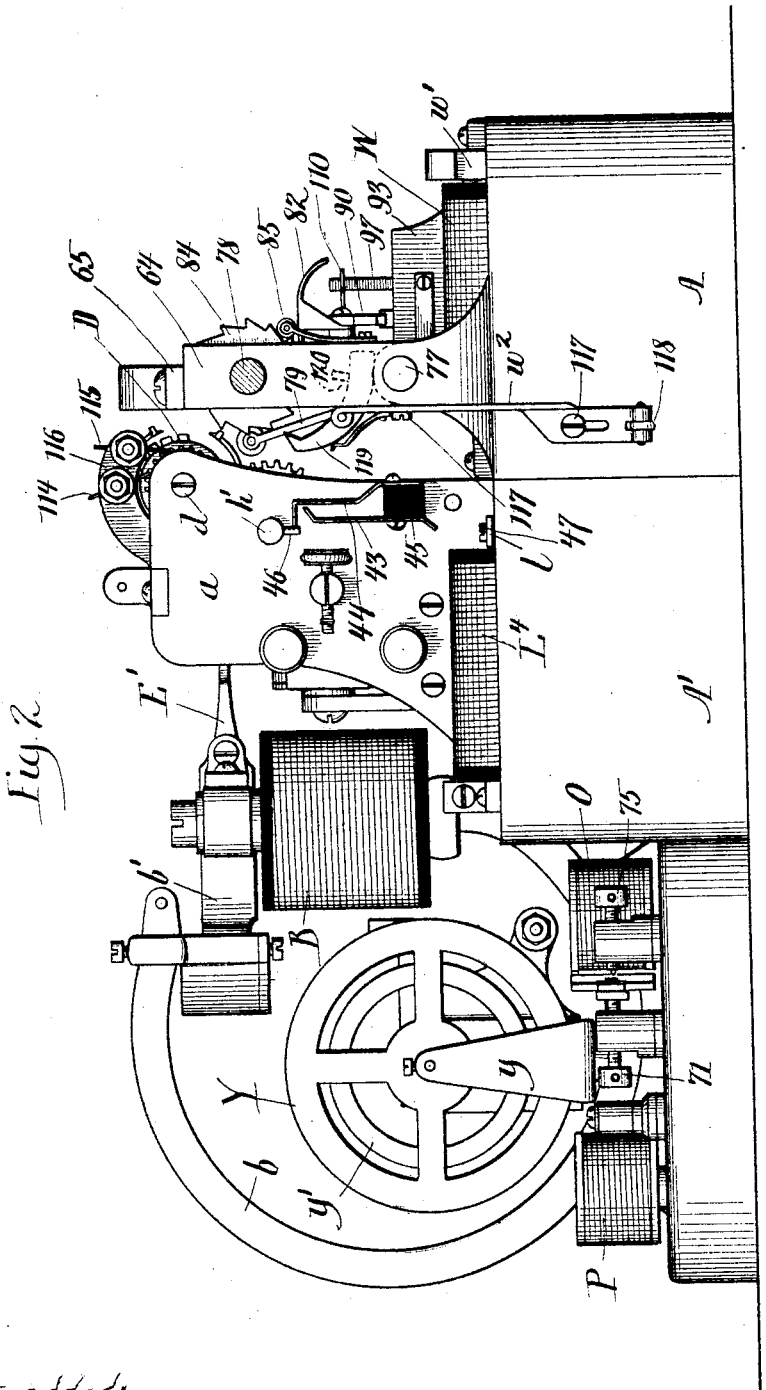

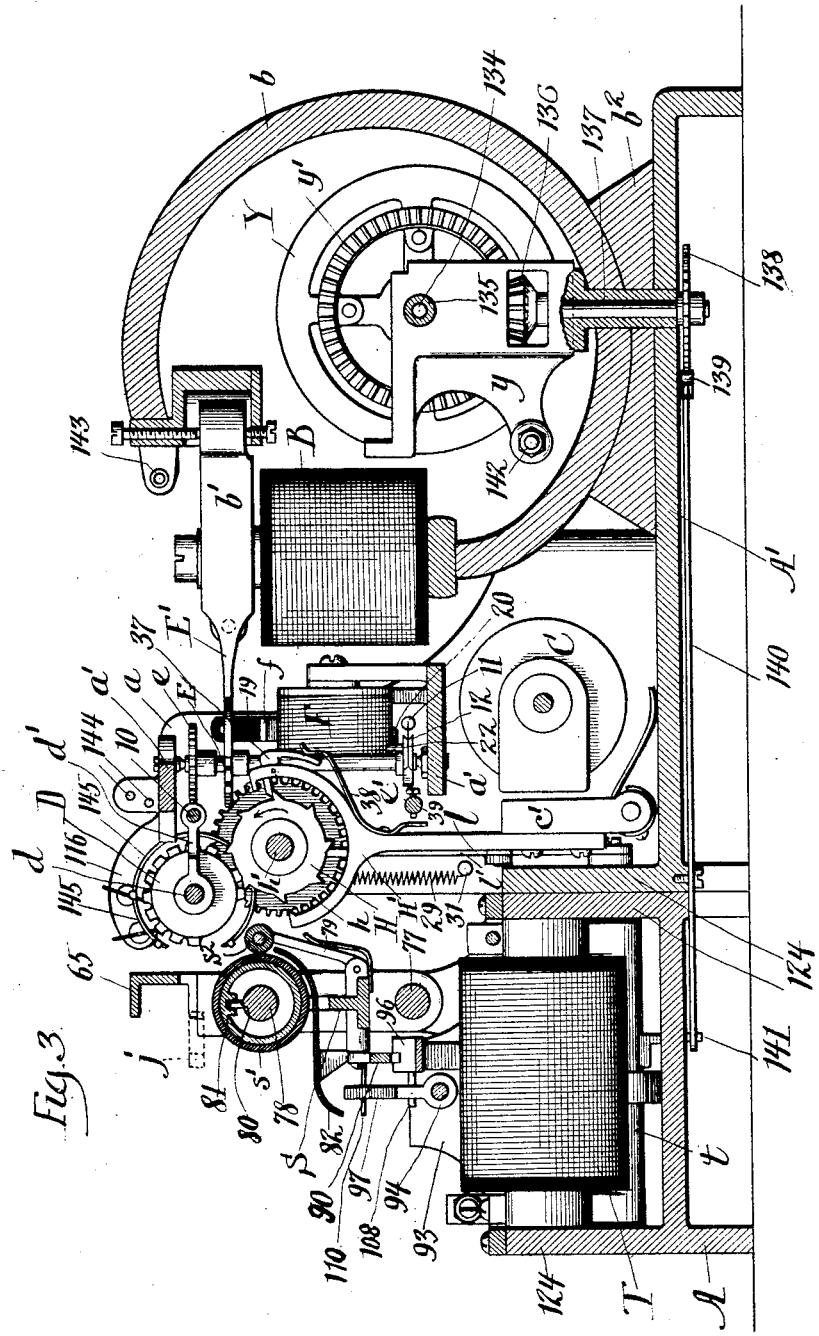

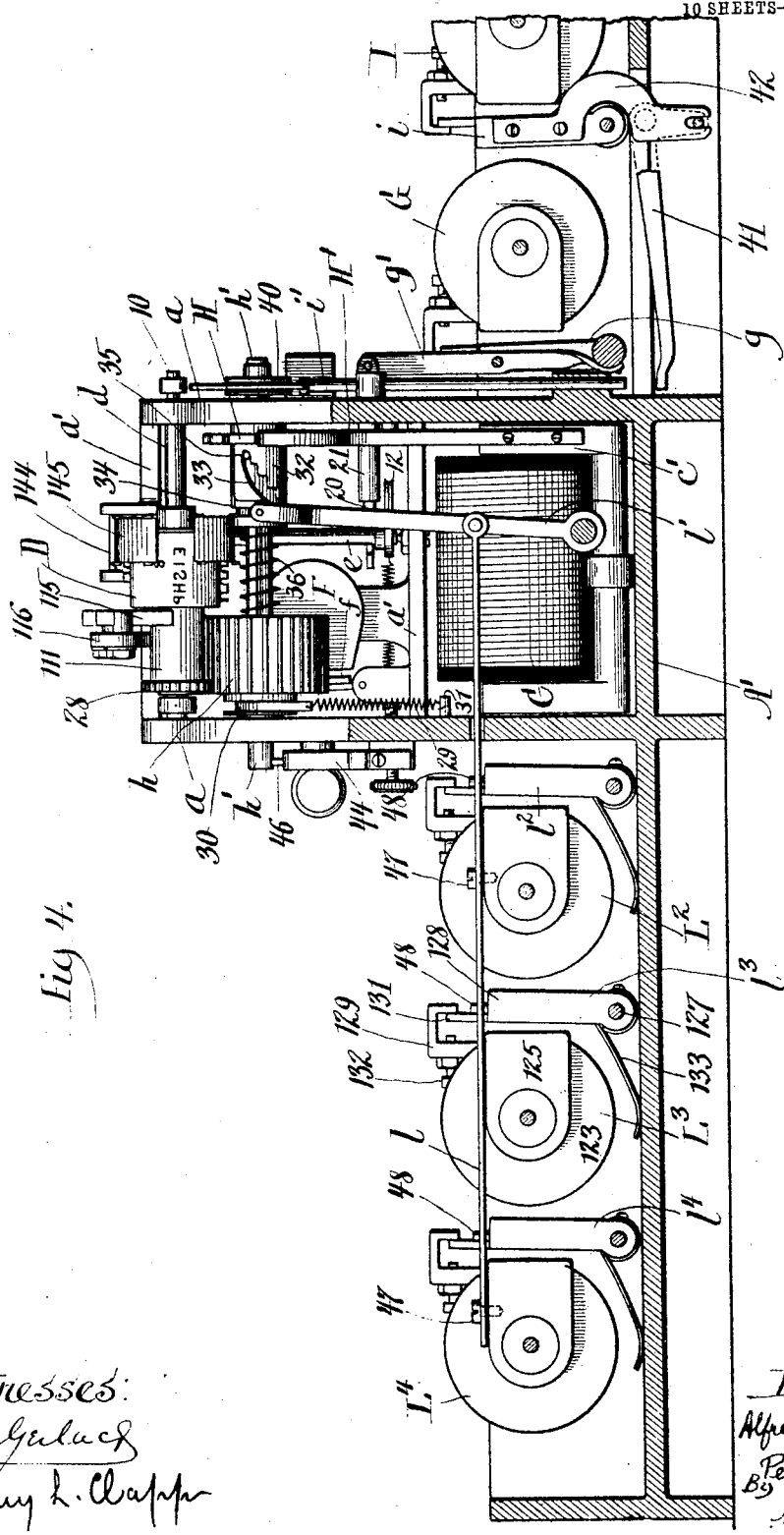

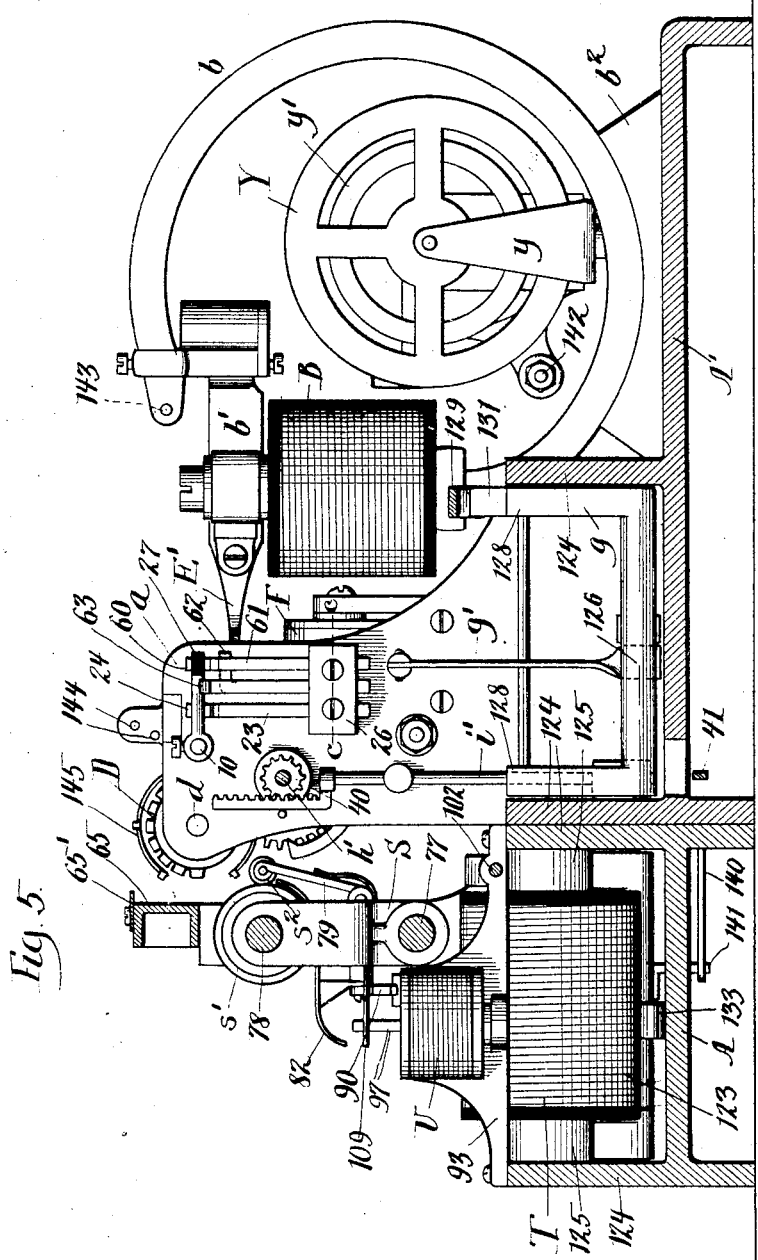

No. 798,671. PATENTED SEPT. 5, 1905.
A. C. GILMORE.
AUTOMATIC TELEGRAPH.
APPLICATION FILED MAR. 10, 1903.
10 SHEETS—SHEET 7.
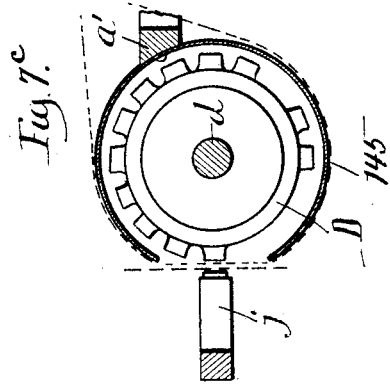
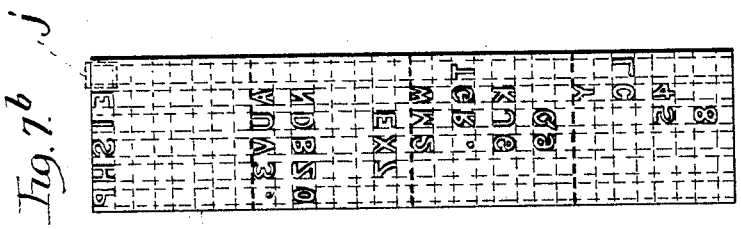
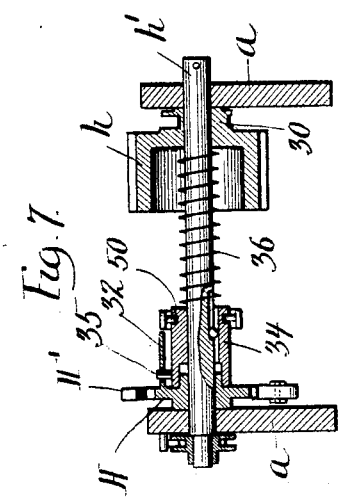
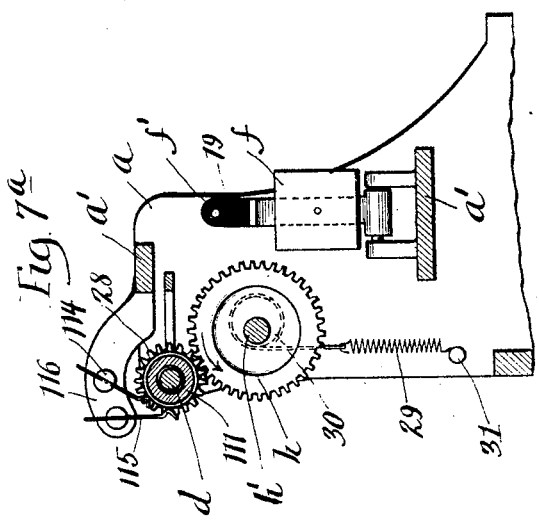
Witnesses:
Fred Gulach
Harry L. Clapp
Inventor:
Alfred C. Gilmore
By Peirce & Fisher
his Attorneys.

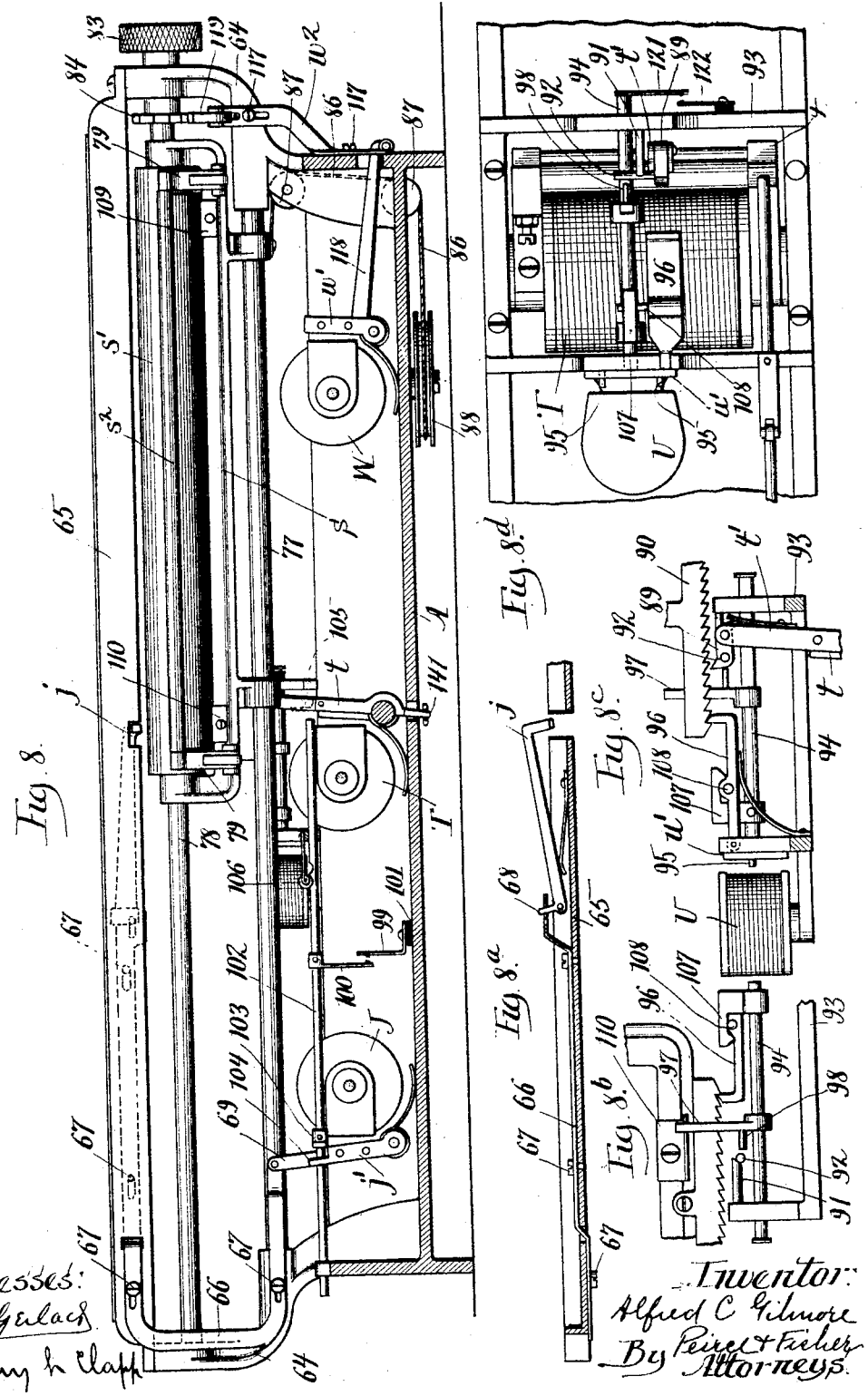

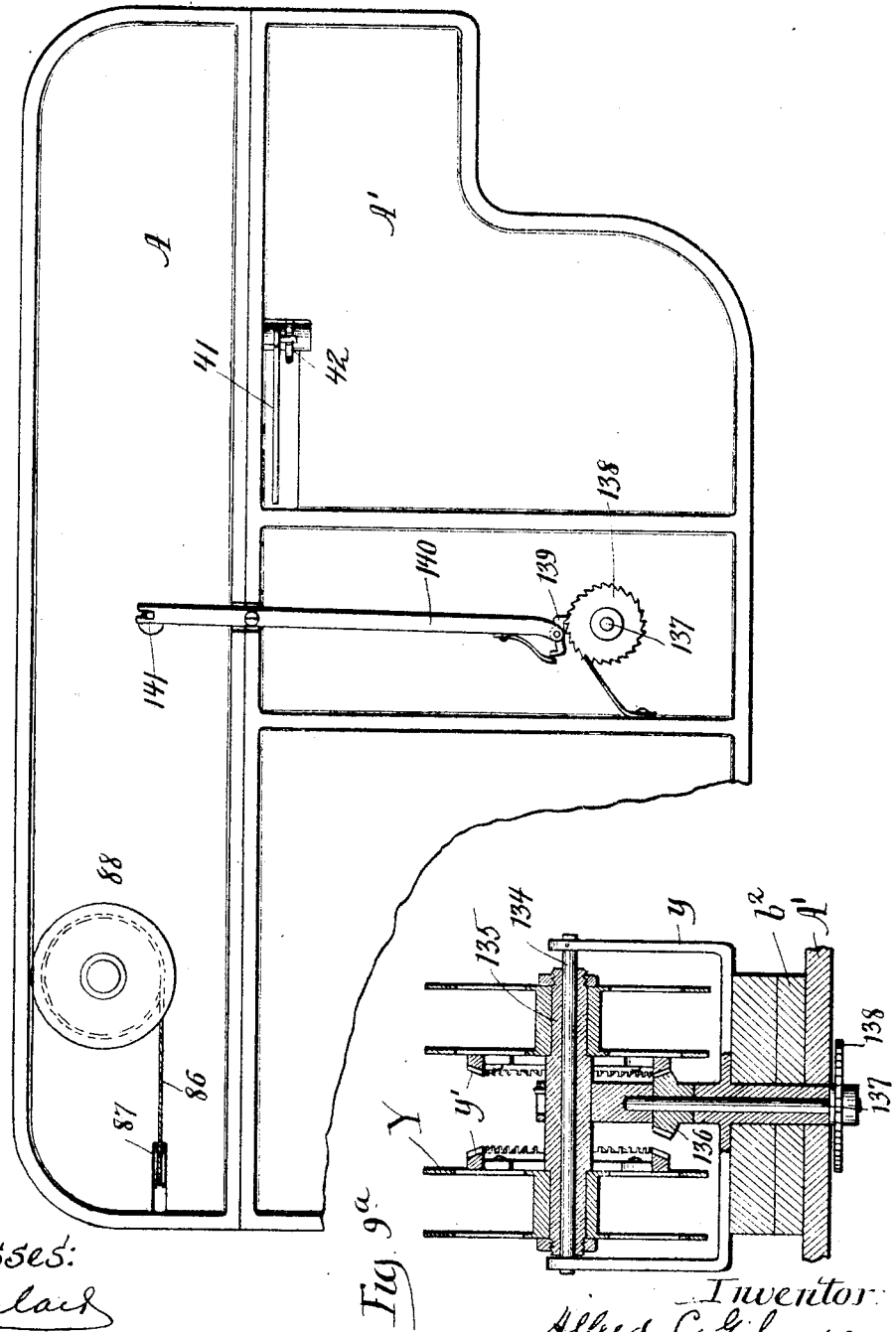

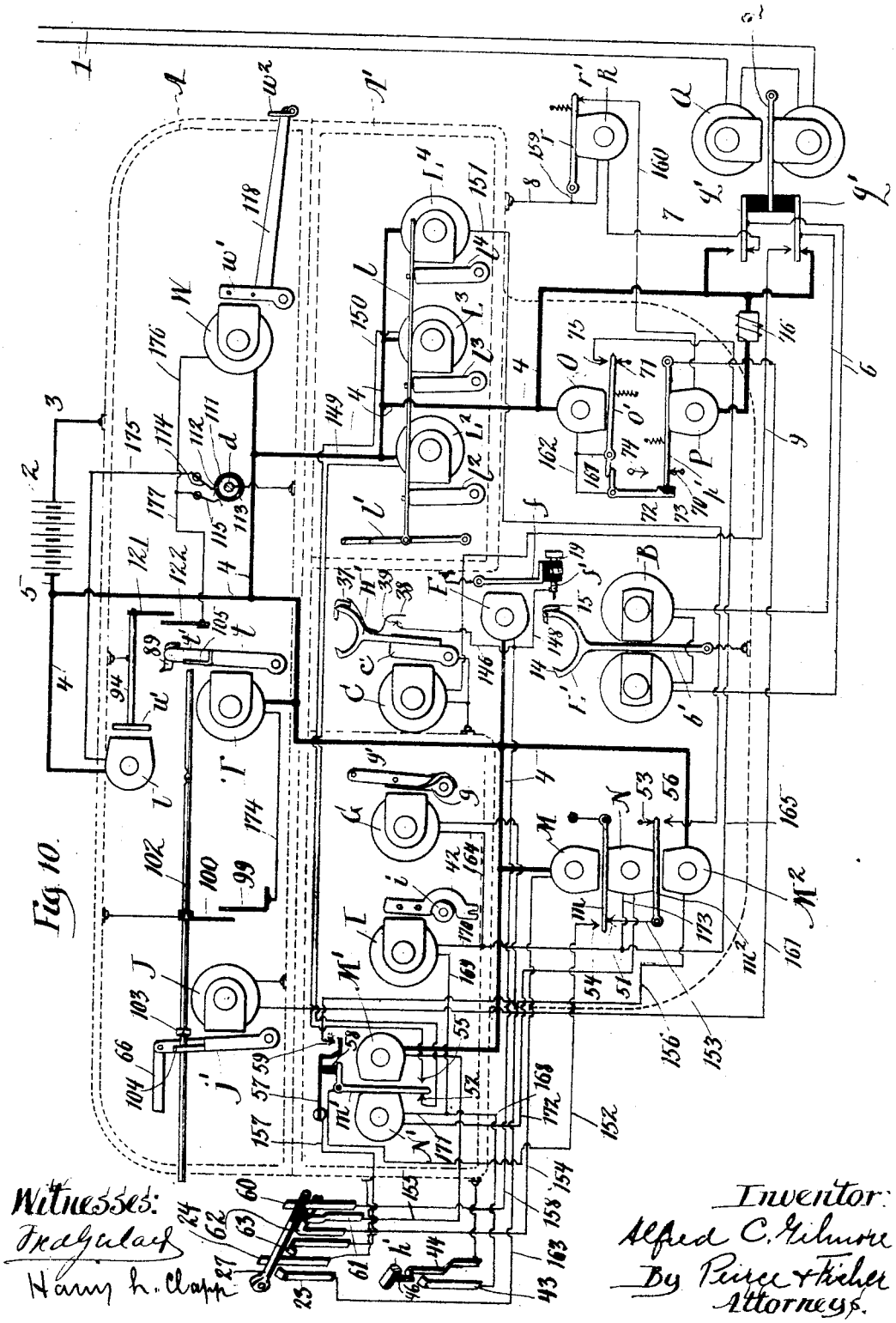

UNITED STATES PATENT OFFICE.

ALFRED C. GILMORE, OF CHICAGO, ILLINOIS, ASSIGNOR TO JAMES H. PEIRCE, TRUSTEE, OF CHICAGO, ILLINOIS.

AUTOMATIC TELEGRAPH.

No. 798,671.      Specification of Letters Patent.      Patented Sept. 5, 1905.

Application filed March 10, 1903. Serial No. 147,188.

*To all whom it may concern:*

Be it known that I, ALFRED C. GILMORE, a citizen of the United States, and a resident of Chicago, county of Cook, and State of Illinois, have invented certain new and useful Improvements in Automatic Telegraphs, of which the following is declared to be a full, clear, and exact description.

The invention relates to printing and similar selective telegraphs, in which the signals or characters are made or printed by varied current impulses, and preferably by variably-timed current impulses of a "dot-and-dash" code.

The present improvement seeks to provide effective means in which the type carrier or wheel is quickly shifted to position to make the signal by a series of shifters and adjusters which respond to the number of varied impulses of the code combinations and which also respond to the order of the varied impulses; and the invention consists in the arrangement set forth in the following description, illustrated in the accompanying drawings, and particularly pointed out in the appended claims.

In the drawings, Figure 1 shows a plan of the improved apparatus; Fig. 2, a side view; Fig. 3, a central transverse section; Fig. 4, a longitudinal section; Fig. 5, a transverse section on line 5 5 of Fig. 1; Figs. 6, 6$^a$, and 6$^b$, details of one of the shifter mechanisms for the type-wheel; Fig. 6$^c$, a detail section on line $c$ $c$ of Fig. 5; Figs. 6$^d$, 6$^e$, and 6$^f$, detail sections on lines $d$ $d$, $e$ $e$, and $f$ $f$, respectively, of Fig. 6$^c$; Figs. 7 and 7$^a$, details of the other shifter mechanism for the type-wheel; Fig. 7$^b$, a development of the type-wheel; Fig. 7$^c$, a side view thereof with the ribbon-guide shown in section; Figs. 8, 8$^a$, 8$^b$, 8$^c$, and 8$^d$, details of the paper-carriage, printing-hammer, and operating mechanism therefor; Fig. 9, inverted plan view; Fig. 9$^a$, a vertical section of ribbon mechanism; Fig. 10, diagram of circuits.

The machine-frame for convenience in assembling the parts preferably comprises separate connected sections A and A', and on frame-section A' are centrally mounted the relays B and C, which are traversed by all impulses received, but respond differently to the varied impulses of the signal-code. Relays B and C are preferably of relatively different resistances and relatively quick and slow acting to respond differently to the variably-timed impulses of a dot-and-dash code. Quick-acting or dot relay B responds to both the long and short impulses, while slow-acting relay or dash C responds to the long impulses only. To insure sensitive action, relay B is preferably polarized and comprises two spools mounted upon a pole of a ring-shaped permanent field-magnet $b$, and its armature $b'$ is pivoted upon the other pole of field-magnet $b$ to swing in a horizontal plane. Field-magnet $b$ is mounted on a suitable support $b^2$, fixed to the frame-section A'.

The type carrier or wheel D is loosely mounted to rotate and slide axially upon a shaft $d$, fixed between uprights $a$ on frame-section A'. A yoke $d'$, (see Fig. 6,) also mounted to slide on shaft $d$, embraces the wheel D and is held against rotation by a guide-pin 10, sliding through an opening in one of the uprights $a$. The outer portion of yoke $d'$ has rack-teeth which mesh with the teeth of a pinion $e$, fixed on a vertical shaft $e'$. The latter is journaled beneath cross-supports $a'$, fixed to uprights $a$, and is propelled in the direction of the arrow, Fig. 6, by a spring 11, (see Fig. 6$^a$,) extending between a compensating cam 12 on shaft $e'$ and an adjusting-screw 13 on one of the uprights $a$. The teeth of an escapement-wheel E on shaft $e'$ are engaged by a shifter or anchor E', fixed on armature $b'$ of the dot-relay B and having a holding and a spacing dog 14 and 15. Spacing-dog 15, which normally engages wheel E and is held thereby against a stop 16, plays between relatively light and heavy springs 17 and 18. When relay B is actuated to operate shifter E', holding-dog 14 engages the teeth of escapement-wheel E and holds it stationary. The spacing-dog 15 is disengaged therefrom and is spaced by light spring 17 far enough to engage the next succeeding tooth of wheel E as armature $b'$ and shifter E' return to normal position. Wheel E is then free to be shifted one step by spring 11. Relay B is thus operated to axially shift the type-wheel step by step to bring the successive longitudinal rows of type thereon to printing position. The type-wheel D and actuating parts may be returned in the opposite direction to normal position, since spacing-dog 15 is yieldingly held into engagement with wheel E by the heavy spring 18.

A magnet F (see Fig. 6$^b$) is mounted upon the lower cross-support $a'$ and its pivoted armature $f$ carries a block 19, of insulating material, through which is adjustably threaded a contact-pin $f''$. The operation of the dash-relay C in response to the long impulses closes the energizing-circuit of magnet F and brings the contact-pin into engagement with the tail of the spacing-dog 15 on the shifter E' and prevents the spacing movement of the dog. The engagement of pin $f''$ with the dog 15 closes a shunt through the magnet F, and the parts are locked in position until shifter E' and the armature $b'$ of dot-relay B return to normal and break the circuit through magnet F; but since dog 15 is thus held against spacing it returns into engagement with the same tooth of wheel E and the type-wheel D is not stepped, and although dot-relay B responds to all impulses, both long and short, it only effects the axial step-by-step movement of the type-wheel in response to the short impulses.

A single-spool magnet G, mounted on frame-section A', has laterally-extending poles operating a pivoted yoke-shaped armature $g$. A restoring-lever $g'$ (see Figs. 4 and 5) is secured to and is actuated by the armature $g$. A link 20, pivoted to the upper end of lever $g'$, slides through a sleeve 21, fixed to upright $a$ and has a hooked end adapted to engage a pin 22 upon the cam 12 and rotate shaft $e'$ against the tension of spring 11. Type-wheel D is thus restored in axial direction to normal when magnet G is energized through the medium of restoring-lever $g'$, arm 20, pinion $e$, and yoke $d'$.

The circuit through magnet G is controlled by a pair of spring-contacts 23 and 24. (See Figs. 5, $6^c$, and $6^d$.) Held between insulating-strips 25 is a support 26 on the side of one of the uprights $a$. A laterally-projecting pin 27, fixed to guide-rod 10, normally engages the upper end of spring 24 and holds it out of contact with spring 23; but a single step of the dot-shifter E' to move the type-wheel longitudinally moves pin 27 and permits the engagement of the spring-contacts. The circuit through restoring-magnet G can therefore only be closed after the dot-relay B has operated to shift the type-wheel in axial direction.

Upon the end of type-wheel D is fixed a pinion 28, which meshes in all positions of the type-wheel with a wide gear $h$, (see Fig. $7^a$,) fixed upon a horizontal shaft $h'$. The latter is journaled between uprights $a$ and is propelled in the direction of the arrow, Fig. $7^a$, by a spring 29, extending between a compensating eccentric 30 on the shaft and an adjusting-pin 31 on one of the uprights $a$. An escapement-wheel H, loose on shaft, has a laterally-projecting lug 32, provided with a short oblique slot 33. (See Fig. 4.) A sleeve 34, (see Fig. 7,) keyed to slide longitudinally on shaft $h'$, has a pin 35 projecting into the slot 33 and adjustably connecting the wheel H to shaft $h'$. A spring 36, coiled about shaft $h'$, extends between gear $h$ and sleeve 34 and normally holds pin 35 in the end of slot 33. The teeth of the escapement-wheel H (see Fig. 3) are engaged by a shifter or anchor H', mounted on the pivoted yoke-shaped armature $c'$ of the relay C, which, as above stated, only responds to the long impulses of the dot-and-dash code. Dash-relay C comprises a single spool, mounted on frame-section A' between uprights $a$ and is provided with laterally-extending poles for operating the yoke-shaped armature $c'$. As armature $c'$ is vibrated shaft $h'$ and type-wheel D are rotated step by step by the pull of spring 29. Shifter H' and wheel H are constructed to operate like an ordinary anchor-escapement, except that normally engaged pawl 37 of anchor H' is yieldingly held by a spring 38, so that the type-wheel and operating parts may be returned in the opposite direction to normal position. The lower end of spring 38 is offset and engages an insulated contact-pin 39 (see Fig. $6^a$) to close the circuit through relay F each time dash-magnet C is actuated and prevent the operation of the dot-shifter E', as above described.

A single-spool magnet I, (see Fig. 4,) mounted on frame-section A, has laterally-projecting poles operating a pivoted yoke-shaped armature $i$. A restoring-arm $i''$, (see Figs. 4 and 5,) sliding vertically through supporting-guides on the side of one of the standards $a$, has rack-teeth on its upper end meshing into the teeth of a pinion 40, fixed on the end of shaft $h'$. A bell-crank lever 41 is pivoted in an opening in the frame-section A', and its downwardly-extended arm has a pin-and-slot connection with a link 42, secured to armature $i$. The horizontal arm of bell-crank 41 is arranged to engage the lower end of the restoring-arm $i''$ and rotate the shaft $h'$ against the tension of spring 29. Type-wheel D is thus restored in circumferential direction, when magnet I is energized through the medium of restoring-arm $i''$, shaft $h'$, and gears $h$ and 28.

The circuit through magnet I is controlled by a pair of spring-contacts 43 and 44, (see Fig. 2,) mounted on an insulating-block 45 on one of the uprights $a$. A pin 46, fixed to the end of shaft $h'$, normally engages the upper end of spring 44 and holds it out of contact with spring 43; but a single step of the dash-shifter H' to rotate the type-wheel D moves the pin 46 and permits the engagement of the spring-contacts. The circuit through restoring-magnet G can therefore only be closed after the dash-relay C has been operated to rotate the type-wheel.

The longitudinal rows of type or character on wheel D are each arbitrarily divided into four sections, as indicated by dotted lines in the development of the wheel shown in Fig. $7^b$, each section being of sufficient length to contain a group of four characters. The escapement-wheel H has the proper number of teeth and is so geared to the type-wheel that the latter is rotated one-quarter of a revolution at each vibration of the shifter H', so the group of characters on each section may be selected by the proper number of short and long impulses operating the dot-and-dash relays B and C irrespectively of the order of long and short impulses in the code combinations. The particular character in each group or section is selected or brought to the printing-point (indicated by dotted outline of printing-hammer $j$) in accordance with the varying order of the dots and dashes in the different code combinations or signals. For this purpose, as shown in Fig. 7$^b$, each section of the type-wheel, which may be brought to the printing-point by only one combination of impulses, has one character, while those sections which may be selected by two, three, and four or more combinations have groups of two, three, and four characters, respectively, except those sections farthest from the printing-point. These latter have no characters and are not used, since they require for their selection a large number of impulses, and the sections which may be brought to the printing-point by few impulses provide a sufficient number of characters. On the type-wheel shown provision is made for thirty-six characters—the letters of the alphabet, numbers, period, and comma.

Any suitable arbitrary arrangement of the characters on the type-wheel and their position in the separate groups or sections may be selected, the object being to bring the most-frequently used characters to the printing-point by the shortest signals or code combinations.

A series of single-spool magnets $L^2$, $L^3$, and $L^4$ (see Figs. 1 and 4) are mounted in line on frame-section A' and have laterally-projecting poles which operate a series of pivoted yoke-shaped armatures or type-wheel adjusters $l^2$, $l^3$, and $l^4$. A sliding shifter-bar $l$ is mounted on two guide-pins 47, passing through slots in the bar and threaded into poles on one side of magnets $L^2$ and $L^4$. Pins 48, fixed to the adjusters $l^2$, $l^3$, and $l^4$, engage slots 49 in the shifter-bar. The ends of the slots 49 are normally at different distances from the pins 48, so that while the throw of adjusters $l^2$, $l^3$, and $l^4$ is practically uniform they will impart a variable throw to the shifter-bar $l$. A lever $l'$, pivoted at its lower end to the frame, is pivoted between its ends to bar $l$ and has a yoke at the upper end engaging an annular slot in sleeve 34, which slides on the shaft $h'$. Pin 35 on sleeve 34 is normally pressed by the shaft-actuating spring 29 against one side of the slot 33 in lug 32, which is fixed to escapement-wheel H, and this side of the slot (see Fig. 4) is provided with a series of four steps. As pin 35 and sleeve 34 are shifted against the tension of spring 36 by bar $l$ and lever $l'$ the pin will successively engage the series of steps, and although escapement-wheel H is held stationary the gears $h$ and 28 and type-wheel D are rotated. The parts are so proportioned that as pin 35 is shifted to engage each successive step on the side of slot 33 the type-wheel is rotated one-sixteenth of a revolution.

The characters and the corresponding signals are arbitrarily divided into four sets, and means controlled by the combined operation of the dot-and-dash relays are provided whereby while the first set will not shift pin 35 the second, third, and fourth sets of signal connections will close circuits through magnets $L^2$, $L^3$, and $L^4$, respectively, and the adjusters $l^2$, $l^3$, and $l^4$, operated thereby, shift pin 35 to respectively engage the second, third, and fourth steps on the side of slot 33. Thus the shifters E' and H' of the dot-and-dash relays B and C will select any group of characters of type-wheel D in accordance with the varying number of dots and dashes in the different code-signals, and the adjusters $l^2$, $l^3$, and $l^4$ will be actuated at the same time by the combined operation of relays B and C to bring the desired character to the printing-point in accordance with the varying order of long and short impulses.

When shaft $h'$ and type-wheel D are rotated back to normal position by the restoring-magnet I and arm $i'$, the pin 35 is pressed against the unnotched side of slot 33, rotates the escapement-wheel H back to normal position, and is itself moved by spring 36 to its initial position.

The circuits through the magnets $L^2$, $L^3$, and $L^4$ are controlled by a series of small magnets M, M', and $M^2$, mounted on frame-section A' and operating pivoted armatures $m$, $m'$, and $m^2$. These armatures have pointed or cam-shaped ends engaged by spring-held rollers 50, mounted on insulating-supports, whereby the armatures are held into engagement with one or the other of a pair of contact-pins on opposite sides thereof. The armatures $m$, $m'$, and $m^2$ are normally held away from their actuating-magnets M, M', and $M^2$ and are held, respectively, against contact-pins 51, 52, and 53, but when shifted respectively engage with contact-pins 54, 55, and 56. A spring-contact 57 is mounted on an insulating-support on frame-section A' and is adapted to be shifted by an insulating-stud 58 on the tail of armature $m'$ into engagement with a contact-pin 59 when the armature is drawn up by its operating-magnet M'.

The circuit through the magnets M, M', and $M^2$ is controlled by the contact-spring 38 on dash-shifter H' and the coöperating contact-pin 39 and by a series of spring-contacts 60, 61, 62, and 63, (see Figs. 5, 6$^c$, 6$^c$, and 6$^r$,) which are held between the insulating-strips 25 in the supporting-clamp 26. An insulated portion of pin 27, (see Fig. 6,) which is operated by the dot-shifter E', normally engages the upper end of spring 60 and holds it against the offset of spring 62. As soon, however, as the dot-shifter E' is operated once pin 27 releases spring 60 and permits it to shift into engagement with the spring-contact 61. A bright portion of pin 27 is arranged to momentarily engage contact-spring 63 as the dot-shifter E' is operated a second time.

The armatures $m$, $m'$, $m^2$ and spring-contact 57 are restored to normal position by magnets N and N', mounted on the frame-section A'. The magnets M and $M^2$ are arranged opposite each and a single restoring-magnet N between them serves to shift armatures $m$ and $m^2$ back to normal position, while magnet N', arranged opposite the magnet M', restores the armature $m'$ and spring-contact 57 to normal. The circuit through restoring-magnets N and N', like that through the restoring-magnet I, is controlled by the spring-contacts 43 and 44, which are normally held apart by the pin 46 on shaft $h'$, and the circuit can only be closed after the dash-shifter H' has been operated.

Frame-section A has outwardly and upwardly projecting extensions 64, connected by the top cross-bar 65. The spring-held printing-hammer $j$ (see Figs. 8 and $8^a$) is pivoted to the outer face of bar 65 and arranged to strike through an opening therein against the type-wheel D. A U-shaped shifter-bar 66 is mounted to shift on guide-pins 67, which are fixed to the cross-bar 65 and to one of the extensions 64 and extend through slots in the shifter 66. The upper member of the shifter-bar extends through an opening in cross-bar 65, and its offset end has an elongated slot within which projects a pin 68 on the pivoted end of the printing-hammer $j$. A single-spool magnet J on frame-section A has laterally-extending poles operating a pivoted yoke-shaped armature $j''$. An arm 69, fixed to armature $j''$, is pivoted to the lower member of the shifter-bar and through the medium of shifter-bar 66 operates the printing-hammer when magnet J is energized.

On frame-section A' at the front and to one side are mounted a pair of oppositely-facing magnets O and P, (see Fig. 1,) operating spring-held armatures $o'$ and $p'$, which are pivoted to the frame to swing in a horizontal plane. Armature $p'$ is normally held up by magnet P against the front stop 70; but armature $o'$ is normally released and held against the back stop 71. A locking-pawl 72, also pivoted to swing in a horizontal plane, has a tailpiece arranged to be engaged by an extension of armature $o'$. The free hooked end of pawl 72 is spring-held against the outwardly-turned end of armature $p'$, but is normally insulated therefrom by a piece 73 on the end of the pawl. This insulating-piece prevents the contact of armature $p'$ with the metal portion of pawl 72 when magnet P releases the armature and the latter is drawn by its spring against the back stop 74; but when armature $p'$ is drawn up its outwardly-turned end engages the metal portion of the hook on pawl 72, is locked in place thereby, and closes a circuit through the magnet J, which actuates the printing-hammer $j$. The engagement of armature $p'$ with the metal portion of pawl 72 also closes a shunt-circuit through magnet O, so that armature $o'$ is drawn up against a contact-pin 75 and a circuit is closed through the dot-restoring magnet G, provided the movement of the dot-shifter E' has been operated and spring-contacts 23 and 24 engaged, and also closes a circuit through restoring-magnets I, N, and N' if the dash-shifter H' has been operated and spring-contacts 43 and 44 engaged. The movement of armature $o'$ also trips locking-pawl 72, breaking the circuit through magnet O, so that armature $p'$ is further shifted by magnet P against front stop 70, and armature $o'$ falls back against back stop 71, breaking the circuit through the restoring-magnets.

A polarized line-relay or pole-changer Q (see Fig. 10) operates an armature $q$, which is provided with a pair of insulated arms $q'$. Arms $q'$ normally engage with one pair of contacts and close the local circuit through the polarized dot-relay B and through a small magnet R. When armature $q$ is shifted, arms $q'$ coöperate with a second pair of contacts to reverse the circuit through dot-relay B, open the circuit through small magnet R, and close the circuit through dash-relay C. The core of the latter is, however, not sufficiently magnetized, as above explained, unless the impulse is prolonged. It will thus be observed that the relays B and C and magnet R are traversed by all impulses received and could, if desired, be energized directly by the line-circuit; but preferably the intermediate relay-line Q is employed. The armature $r$ of magnet R is normally drawn up against a contact-pin $r'$ to normally close the circuit through magnet P. At the first impulse of the signal this circuit is opened and armature $p'$ falls away against back stop 74. As the signal is received the circuit of magnet P is traversed by all impulses received, is alternately opened and closed by the vibration of armature $r$; but magnet P is somewhat sluggish, and a choke-coil 76 (see Fig. 10) is interposed in its circuit, so that armature $p'$ will not be drawn up to close the circuits through hammer-actuating magnet J and restoring circuit-closer O except at the pauses between completed signals.

A paper-carriage S (see Figs. 1, 3, and 8) is mounted to slide longitudinally upon a guide-rod 77 and a rotatable shaft 78, which extend between the uprights 64 on frame-section A. A hollow paper supporting and feed roll $s'$, mounted upon shaft 78 between the sides of the carriage S, coöperates with a pressure feed-roll $s^2$ to feed the paper sheet between type-wheel D and cross-bar 65 and over the opening therein through which the printing-hammer $j$ strikes. Pressure-roll $s^2$ is journaled between the free ends of a pair of spring-pressed arms 79, pivoted to carriage S. The feed-roll $s'$ slides with the carriage on the shaft 78, but is connected to rotate therewith by a pin 80, (see Fig. 3,) fixed to the shaft and extending between a pair of longitundinal ribs 81 on the inner face of the hollow roll. The forward edge of the paper is directed between the feed-rolls $s'$ and $s^2$ by a curved guide-plate 82, mounted on the carriage. Shaft 78 may be manually rotated in either direction to feed the paper by a thumb-piece 83 on its end. A ratchet-wheel 84, fixed on the end of shaft, is engaged by a spring-held retaining-roller 85, so that the feed-rolls and paper are securely held against accidental movement during the printing operation.

The paper-carriage S is connected at one end (see Fig. 8) by a cord 86, passing over guide-pulleys 87 to a spring-drum 88, rotatably mounted on the bottom of frame-section A. (See Fig. 9.) The carriage is propelled step by step in letter-space direction against the pull of drum 88 by a single spool-magnet T, mounted centrally on frame-section A. The laterally-extending poles of this magnet operate a pivoted yoke-shaped armature $t$, to which is fixed an upwardly-extending arm $t'$. A drive-pawl 89, (see Figs. $8^b$ and $8^c$,) pivoted on the upper end of arm $t'$, is arranged to engage the teeth of a rack 90, mounted on the lower portion of carriage S. Pawl 89 is spring-pressed toward the teeth of rack 90, but is normally held disengaged therefrom by a horizontal pin 91, the inclined end of which engages with a laterally-projecting pin 92 on the pawl. Pin 91 is mounted on one of the side bars of a rectangular open support 93, (see Fig. $8^d$,) mounted on frame-section A' above the magnet T. A rod 94, mounted to slide between the side bars of support 93, carries at one end the armature $u'$ of a small magnet U, mounted on one of such side bars. Guide-pins 95 on the side bar extend through openings in armature $u'$ and hold the latter and the rod 94 against lateral twist. A retaining-pawl 96, (see Figs. $8^b$, $8^c$, and $8^d$,) pivoted to the side bar of support 93, is spring-pressed upwardly into engagement with the teeth of rack 90 and holds the carriage S in position against the pull of spring-drum 88 as the carriage is propelled step by step by drive-pawl 92. An upright arm 97 on the sliding rod 94 has a laterally-projecting pin 98 arranged adjacent the pin 92 on pawl 89. As armature $t'$ is drawn up by magnet T drive-pawl 89 is released from pin 91 and is pressed upwardly into engagement with the teeth of rack 90 and shifts the paper-carriage S. As the pawl is so shifted pin 92 thereon is disengaged from pin 91 and passes above the pin 98 on arm 97, locking the pawl 89 against the teeth of rack 90, so that the thrust of the pawl can only space the carriage one step at a time. As the armature $t$ falls back the pin 92 is disengaged from pin 98 and passes beneath the beveled end of pin 91, and the drive-pawl 89 is automatically disengaged from the teeth of rack 90.

The circuit through the letter-space magnet T is controlled by a pair of spring-contacts 99 and 100. Contact 99 is mounted upon an insulating-block 101, and contact 100 is adjustably secured to a shifting rod 102, which is mounted to slide longitudinally through guides on the upper portion of frame-section A. A lug 103, adjustably secured to the rod 102, is arranged to be engaged by an extension 104 on the upper end of armature $j''$, and as hammer-actuating magnet J is operated rod 102 is shifted to bring the normally disengaged springs 99 and 100 into contact and closing the circuit through spacing-magnet T. An extension 105 on the upper end of armature $t$ is arranged to engage the end of rod 102 as magnet T is operated, shift the rod back to normal position, and open the circuit. A spring-held roller 106 engages a pair of notches in bar 102 and yieldingly holds it in either of its shifted positions.

A bent lug 107 on the sliding rod 94 is arranged above a laterally-projecting pin 108 on the retaining-pawl 96, and the upright arm 97 on rod 94 is arranged in the path of movement of a pair of adjustable projecting lugs 109 and 110 on the carriage S. As the latter reaches the end of its letter-space movement lug 109 engages arm 97 and shifts rod 94. Lug 107 engages pin 108 and shifts retaining-pawl 96 out of engagement with the teeth of rack 90. The carriage is thus free and is quickly returned by spring-drum 88 to the other side of the machine. At the end of the return movement lug 110 engages the arm 97, returns rod 94 to normal position, and retaining-pawl 96 is released into engagement with the teeth of rack 90. The carriage may then again commence its step-by-step movement in letter-space direction.

On one end of the type-wheel D is a reduced extension 111, (see Figs. 4, 6, and 10,) covered with insulating material and having a pair of contacts 112 and 113. A pair of brushes 114 and 115, mounted upon but insulated from a curved arm 116 (see Figs. 1 and 2) on the upper cross-support $a'$, normally rest upon the insulated covering on extension 111. When a special signal is transmitted over the line, type-wheel D will be positioned to bring contact 112 into engagement with brush 114 and close the circuit through the magnet U to shift armature $u'$ and rod 94 and release the carriage S in the manner above described. As the type-wheel is returned to normal contact 112 is shifted away from brush 114 and the circuit through carriage-release magnet U is opened, and as the carriage is returned by drum 88 lug 110 thereon engages arm 97 on the rod 94 and returns the latter to normal position. Carriage S may therefore be returned to commence a new line at will by the transmission of a special signal and is also automatically returned when it reaches the end of its travel, as previously described.

A single spool-magnet W (see Fig. 8) is mounted at one end of frame-section A and has laterally-projecting poles operating a pivoted yoke-shaped armature $w'$. A shifter $w^2$ (see Fig. 2) is mounted to slide vertically on guide-screws 117, fixed to the end of frame-section A and upright 64 and extending through slots in the shifter. An arm 118, secured to armature $w'$, is pivoted at its free end to lower end of shifter $w^2$. A spring-held feed-pawl 119, pivoted on the upper end of shifter $w^2$, is arranged to engage the ratchet-wheel 84 on the end of shaft 78. In normal position the tail of pawl 119 engages the horizontal portion of extension 64, and the pawl is held out of engagement with ratchet 84; but as armature $w'$ is drawn up by magnet W it is lifted by shifter $w^2$ into engagement with ratchet-wheel 84 and rotates feed-rolls $s'$ and $s^2$ to feed the paper in line-space direction. A pin 120 on the tail of pawl 119 engages the ratchet 84 and the end of movement of shifter $w^2$ and prevents an overthrow of the feed-rolls.

A spring-contact 121, (see Fig. 8$^d$,) mounted on the end of sliding rod 94, is arranged to engage an insulated spring-contact 122 on the side of support 93 and close the circuit through the line-space magnet W whenever the armature $u'$ and rod 94 are shifted. The line-space is therefore always actuated when the carriage is released either by a special signal or by the engagement of lug 109 on the carriage with the arm 97, so that the paper and carriage are simultaneously shifted to permit the commencement of a new line of print. As soon as rod 94 is returned to normal by the engagement of lug 110 on the carriage with arm 97 the contacts 121 and 122 are separated and the circuit through line-space magnet W is broken.

The line-space may be operated independently of the carriage-release by the transmission of a special signal over the line, which will bring contact 113 on the extension 111 of type-wheel D into engagement with brush 115 and close the circuit through magnet W.

Each one of the several magnets or relays C, G, I, $L^2$, $L^3$, $L^4$, J, T, and W comprises a single spool 123, (see Figs. 1, 4, and 5,) mounted between vertical ribs 124 on frame-section A and A' and are provided at either end with laterally-extending poles 125. The yoke-shaped armatures of these magnets each comprises a central portion 126, journaled on a spindle 127, extending between the ribs 124, and upwardly-projecting arms 128, arranged adjacent the poles 125. A U-shaped member 129, adjustably secured on one of the poles 125 by a screw 130, (see Fig. 1,) passing through a slot therein, surrounds an extension 131 of one of the arms 128, serves as a back stop for the armature, and is provided with an adjustable front stop 132. A leaf-spring 133, fixed to the central section 126 of the armature, engages the horizontal portion of the frame and normally holds the armature with the extension 131 against the back stop 129.

A yoke $y$, (see Figs. 3 and $9^a$,) mounted within the ring-shaped field-magnet $b$, carries at its upper end a shaft 134, upon which is mounted a sliding sleeve 135. A pair of ribbon-spools Y are independently journaled on sleeve 135, but are connected to shift axially therewith. A beveled gear $y'$ on the inner face of each spool Y is arranged to engage a beveled pinion 136 on the upper end of a short shaft 137. A ratchet-wheel 138 on the lower end of shaft 137 and beneath the horizontal portion of frame A' is engaged by a spring-held drive-pawl 139, (see Fig. 9,) pivoted on one end of a shift-lever 140. The latter is pivoted to the under side of the frame, and its opposite end is provided with a slot into which projects an extension 141 on armature $t$ of letter-space magnet T. As the armature $t$ is vibrated the ratchet 138 and pinion 136 are rotated step by step in one direction. By shifting sleeve 135 the gear $y'$ on either of the spools Y may be brought into engagement with pinion 136 to wind the ribbon in opposite directions. The ribbon passes from spools Y under guides 142 (see Fig. 3) on yoke $y$, over guide-rolls 143 (see Fig. 1) on the end of field-magnet $b$, over a pair of pins 144, fixed between uprights on bar $a'$, and over a curved ribbon-guide plate 145, (see Fig. $7^c$,) fixed to the bar $a'$. The curved guide-plate 145 surrounds the type-wheel D and is cut away opposite the printing-point, so that printing-hammer $j$ may strike the paper and ribbon against the type.

The operating-circuits are diagrammatically indicated in Fig. 10. The line-circuit $l$ passes through the line-relay Q and normally holds its armature $q$ and arms $q'$ therein in the position indicated. The long and short impulses of the signal-code are transmitted over the line from the sending-station by any suitable form of transmitter which alternately reverses the direction of the current through the line-circuit and which is preferably automatic in its action, so that the dot-and-dash impulses may be accurately timed. The metal frame A A' of the machine (indicated in outline in Fig. 10) is connected to one side of a local battery 2 by a wire 3, and one end of several of the contacts and operating magnet-coils are directly grounded to the frame, as indicated. One end of other magnet-coils and two contacts of line-relay Q are directly connected by several branch wires 4 (indicated by heavy lines) and a lead 5 to the other side of battery 2. Normally the current from local battery 2 passes by lead 5 and branches 4 to one of the arms $q'$ of line-relay Q, by wire 6 through the polarized dot-relay B to the other arm $q'$, by wire 7 to magnet R, and by wire 8, frame, and lead 3 back to battery. Armature $b'$ and dot-shifter E' are thus normally held with its loose dog 15 in engagement with escapement-wheel E, and armature $r$ is normally held up against contact $r'$. When the direction of the current through line-relay Q is reversed and armature $q$ and arm $q'$ shifted, the current from local battery flows by wires 5 and 4 to one of the arms $q'$, by wire 6, through dot-relay B, in the reverse direction and to the other arm $q'$, thence by wire 9 through dash-relay C and through the frame back to battery. The circuit through magnet R is thus broken and its armature released, and the circuit through relay C is closed. If the reversal through line-relay Q is prolonged by a dash impulse armature $c'$ and dash-shifter H' of the relatively slow-acting relay C are operated. The movement of shifter H' brings contact-spring 38 into engagement with pin 39, and the circuit through magnet F may be traced from battery through the frame and armature $c'$ by contacts 38 39 and wire 146 through magnet F and by branch wires 4 back to battery. Armature $f$ is thus shifted, bringing contact-pin $f'$ against the tail of dog 15 of dot-shifter E'. A locking-shunt is then closed through magnet F from the frame to dog 15 and contact-pin $f'$ and by wire 148 through magnet F to battery-wire 4. Pin $f'$ locks dog 15 against spacing until armature $b'$ and dot-shifter E' (which are vibrated by all reversals in the line-circuit whether prolonged or not) return to normal position. Dog 15 then moves into engagement with wheel E without stepping it, and the circuit through the locking-magnet F is broken. In this manner shifters E' and H' operate in response to the short and long impulses of the signal-code, respectively, to shift the type-wheel axially and rotate it to select one of the group of characters thereon. It will thus be observed that the operating-relays B and C are traversed by all impulses received, but are arranged to respond differently to the modified code impulses. These code impulses are preferably transmitted by reversing the direction of the current through the line, but may be transmitted by simply opening and closing the circuit. Moreover, the operating-relays B and C may be suitably modified and included directly in the line-circuit or any other suitable arrangement may be provided. It is only desirable that they shall be traversed by all impulses received and shall respond differently thereto. It may also be noted that the operating-relays B and C could be suitably modified to respond differently to code impulses of different strengths or of different polarity.

As stated, the characters and signals are arbitrarily divided into four sets and in the present instance as follows: First, one or more dots, which may or may not be followed by one or more dashes; second, one or more dashes, which may or may not be followed by one or more dots; third, one or more dashes followed by one or more dots and one or more dashes, and, fourth, a single dot followed by one or more dashes and one or more dots. The particular character of the group selected, as above described, is brought to the printing-point in accordance with the set of combinations to which its representative signal belongs.

One end of the coils of adjuster-magnets $L^2$, $L^3$, and $L^4$ are connected to battery-wire 4, and the other ends of the coils are connected, respectively, by wires 149, 150, and 151 to contacts 55 and 52 on opposite sides of armature $m'$ and to contact 56 adjacent armature $m^2$. These armatures are connected, respectively, by wires 152 and 153 to contacts 54 and 51 on opposite sides of armature $m$, which is grounded to the frame. One end of the coils of magnets M, M', and $M^2$ are connected to local battery 2 by branch wires 4, and the other ends of the coils are connected, respectively, by wires 154, 155, and 156 with spring-contacts 62 and 61 and with contact-pin 59. Spring-contact 57 is connected by wire 157 with spring-contact 63 and spring-contact 60 is connected by wires 158 and 146 with contact-pin 39.

With the first set of signal combinations (one or more dots, which may or may not be followed by one or more dashes) the first short impulse shifts pin 27, (which, as above described, is connected to be moved laterally step by step by dot-shifter E',) breaks contact between springs 60 and 62, opening the circuit through magnet M at this point, and makes contact between springs 60 and 61. At the second short impulse pin 27 momentarily contacts with spring 63, but will not close the circuit through magnet $M^2$, since spring 57 is normally held away from contact 59. At the first subsequent long impulse (if one is included in the signal) a circuit is closed from the frame through armature $c'$ to contacts 38 and 39 by wires 146 158 to contact-springs 60 and 61 and by 155 through magnet M' to one of the branches of battery-wire 4. Armature $m'$ is drawn up; but since wire 152, leading therefrom, is open at contact 54 the circuits through magnets $L^2$, $L^3$, and $L^4$ remain open and pin 35 remains in engagement with the first step of the groove 33 in lug 32, and the first character of the selected group is brought to the printing-point. With the second set of signals (one or more dashes, which may or may not be followed by one or more dots) the first long impulse will close a circuit from the frame through armature $c$, contacts 38 and 39, wires 146 and 158, contact-springs 60 and 62, and wire 154 through magnet M to one of the branches of battery-wire 4. Armature $m$ is drawn up and a circuit is closed from the frame through armature $m$, contact-pin 54, wire 152, armature $m'$, contact 52, and wire 149 through magnet $L^2$ to one of the branch battery-wires 4. Type-wheel adjuster $l^2$ will be shifted and move pin 35 opposite the second step on lug 32, so that type-wheel D is further rotated by drive-spring 29 one-sixteenth of a revolution, and the second character of the selected group is brought to the printing-point. It is obvious that the subsequent short impulses (if there are any in the combination) will not affect magnets M' and $M^2$. With the third set of signals (one or more dashes followed by one or more dots and one or more dashes) at the first long impulse, as above described, armature $m$ is drawn up against contact 54, closing the circuit through magnet $L^2$ and operating adjuster $l^2$. At the subsequent short impulses contact-spring 60 engages spring 61, so that at the next subsequent long impulses a circuit is closed from the frame through armature $c'$, wires 146 and 158, springs 60 and 61, and wire 155 through magnet M' to one of the branch wires 4. Armature $m'$ is then drawn up against contact 55, and a circuit is closed through from the frame through armature $m$, contact 54, wire 152, armature $m'$, contact 55, and wire 150 through magnet $L^3$ to battery-wire 4. Type-adjuster $l^3$ is then operated to shift pin 35 into engagement with the third step of sleeve 32, and the third character of the selected group is brought to the printing-point. With the fourth set of signals (a single dot followed by one or more dashes and one or more dots) the first short impulse closes contact between springs 60 and 61. The immediately-following long impulses will close a circuit, as above described, through magnet M', drawing up armature $m'$ and bringing spring 57 into contact with pin 59. The second short impulse momentarily closes a circuit from the frame through pin 27, spring 63, wire 157, spring-contact 57, contact 59, and wire 156 through the magnet $M^2$ to one of the branch wires 4. Armature $m^2$ is then drawn up against contact 56 and closes a circuit from the frame through armature $m$, wire 153, armature $m^2$, contact 56, and wire 151 through magnet $L^4$ to one of the battery branch wires 4. Type-adjuster $l^4$ is thereby actuated to shift pin 35 to the fourth step on sleeve 32, and the fourth character of the selected group or section on type-wheel D is brought to the printing-point. By thus selecting a particular group of characters in accordance with the number of varied impulses and simultaneously selecting one of the group in accordance with the order of the impulses a large number of characters may be represented by short signals and the message may be rapidly printed.

It will be observed that each of the adjusters $l^2$, $l^3$, and $l^4$ are controlled by the combined operation of the relays B and C—that is to say, each of the circuits through the separate magnets $L^2$, $L^3$, and $L^4$ is controlled by the combined operation of the variably-actuated relays B and C in accordance with the varying order of the modified code impulses.

As above stated, armature $r$ is normally drawn up against contact $r'$ and closes a circuit from the machine-frame and wires 8 and 159 through armature $r$ and contact $r'$ and wire 160 through magnet P and choke-coil 76 to one of the branch battery-wires 4, and armature $p'$ is normally held up against front stop 70. At the first impulse of the signal armature $r$ is released, and armature $p$ falls back against back-stop 74, but is prevented from making contact with the metal of pawl 72 by the insulating-piece 73 thereon. The subsequent engagements of armature $r$ with contact $r'$ as the signal is received and consequent completions of the circuit through magnet P and choke-coil, since such coil holds back the rise and fall of current by self-induction, will be of insufficient duration to draw up the armature $p'$ until the armature $r$ is brought to rest at the pauses between completed signals against contact $r'$ for an appreciable period, since the choke-coil holds back the rise and fall of current by self-induction. As armature $p'$ is then drawn up against the hooked end of pawl 72 it will be momentarily held, thereby completing a circuit through the frame, hammer-actuating magnet J, wire 161, armature $p'$, pawl 72, wire 162, magnet O, and printing-hammer $j$ is actuated and armature $o'$ drawn up against contact 75. This movement of armature $o'$ trips pawl 72, breaking the circuit through the hammer-actuating magnet J and permitting armature $p'$ to return to normal position.

If the dot-sifter E' has been operated and closes contact-springs 23 and 24, the engagement of armature $o'$ with contact 75 closes a circuit from the frame through contacts 24 and 23, wire 163, through dot-restoring magnet G, wires 164 and 165, contact 75, armature $o'$, wires 167 and 162, through magnet O to one of the battery branch wires 4. This circuit is thus locked in closed condition until the axial return movement of type-wheel D, yoke $d'$, and pin 27 separates the contacts 23 and 24. Similarly, if dash-sifter H' has been operated and closes contact-springs 43 and 44 the restoring-circuit is closed from the frame contact-springs 44 and 43, wires 168 and 169, through dash-restoring magnet I, wires 170 and 165 to armature $o'$ and through magnet O, as before, and also from wire 168 through branch wire 171, restoring-magnet N', wire 172, restoring-magnet N, and wire 173 to wire 165. Type-wheel D is thereby rotated back to normal position, and armatures $m$, $m'$, and $m^2$ (which are not shifted unless the dash-relay C has been operated) are restored to normal. By shunting this circuit through magnet O the restoring-circuit is locked in closed condition until the type-wheel and operating parts have been shifted back to initial position and pin 46 on shaft $h'$ has disengaged contacts 43 and 44. All parts are thus quickly and simultaneously put in condition to receive the next signal.

The operation of the hammer-actuating armature $j'$ shifts the sliding rod 102 and closes a circuit from the frame through rod 102, contacts 100 and 99, and wire 174 through the letter-space magnet T to one of the branch wires 4. The operation of armature $t$ shifts rod 102 back to normal position, separates contacts 100 and 99, and opens the circuit.

By sending a special signal over the line, in this instance a single long impulse, type-wheel D is rotated one step, but presents a blank space at the printing-point, so the only effect of the operation of the apparatus is to advance the carriage one step, and thus properly space the printed words. Other special signals operate to shift type-wheel D to bring either contact 112 on extension 111 and brush 114 or contact 113 and brush 115 into engagement, and in either of these positions a blank space on the type-wheel is presented at the printing-point. In the first instance a circuit is closed from the frame through the type-wheel, contact 112, brush 114, and wire 175 through the carriage-release magnet U to one of the battery branch wires 4, so that armature $u'$ and rod 94 are shifted to release the carriage and permit its return to initial position, as above described. When contact 113 engages brush 115, a circuit is closed from the frame through the type-wheel and extension 111, contact 113, brush 115, and wire 176 through magnet W to one of the battery branch wires 4 and operate the line-space mechanism. When armature $u'$ and rod 94 are shifted either by magnet U or mechanically by lug 109 on the carriage, a circuit is closed from the frame through contacts 121 and 122, wires 177 and 176 through the line-space magnet W, and both the carriage-release and line-space are operated to shift the carriage and paper so that a new line may be commenced. This circuit through the magnet W is of course broken, as described, when the carriage returns to its initial position.

It is obvious that numerous changes could be made in the details of construction and arrangement of circuits without departure from the essentials of the invention. The operating-relays B and C, though preferably responding differently to variably-timed impulses, could be adapted to respond differently to impulses modified in strength or polarity without affecting the operation of the other parts of the apparatus. The operating-relays B and C could be readily changed so that they could be included directly in the line-circuit instead of being indirectly controlled by the line impulses through the medium of an intermediate relay. It is only desirable that both relays shall be traversed by all impulses received, either directly or indirectly, and arranged to respond directly to the modified code impulses; but the invention is sufficiently broad to cover any arrangement of separate relays arranged to respond differently to modified code impulses in combination with means controlled by the combined operation of such relays for shifting the type-carrier in accordance with the varied number and order of the modified code impulses.

Having described my invention, what I claim as new, and desire to secure by Letters Patent, is—

1. In automatic telegraph systems in which the characters are represented by different numbers of successive modified impulses, a type-carrier separate shifters for variably moving said type-carrier, and means acting in response, both to the varied order and the varied number of impulses in the different code combinations for variably actuating said shifters.

2. In automatic telegraph systems in which the characters are represented by different numbers of successive modified impulses, a type-carrier, a series of adjusters for variably shifting said carrier, a series of operating-magnets for said adjusters and means acting in response both to the varied order and to the varied number of impulses in the different code combinations for controlling the energizing-circuits of said magnets.

3. In automatic telegraph systems in which the characters are represented by different numbers of successive variably-timed impulses, a type-carrier, a series of adjusters for variably shifting said type-carrier, a series of actuating-magnets therefor and means acting in response both to the varied order and to the varied number of impulses in the different code combinations for controlling the energizing-circuits of said magnets.

4. In automatic telegraph systems in which the characters are represented by different numbers of successive modified impulses, separate electrical devices arranged to respond differently to the modified impulses of the signal-code, a type-carrier and means controlled by the combined operation of said electrical devices and acting in response both to the varying order and to the varying number of impulses in the different code combinations for variably shifting said type-carrier.

5. In automatic telegraph systems, separate relays arranged to respond differently to the modified code impulses, a type-carrier and a series of adjusters for variably shifting said carrier, each of said adjusters being controlled by the combined operation of said separate relays.

6. In automatic telegraph systems, a single line-circuit, separate relays controlled by said line-circuit, arranged to be traversed by all impulses received and to respond differently to the modified code impulses, a type-carrier, a series of adjusters for variably shifting said carrier, a series of actuating-magnets therefor and separate energizing-circuits for said magnets, each of said circuits being controlled by the combined operation of said relays.

7. In automatic telegraphs, separate relays relatively quick and slow acting to respond differently to the variably-timed impulses of the signal-code, a series of adjusters for variably shifting said carrier, a series of magnets for actuating said adjusters and separate energizing-circuits for said adjusting-magnets, each of which circuits is controlled by the combined operation of said relays.

8. In automatic telegraphs, separate relays arranged to respond differently to the modified code impulses, a type-carrier, a series of adjusters for variably shifting said carrier, separate sets of contacts controlled respectively by said separate relays and means controlled by both sets of contacts for operating said adjusters.

9. In automatic telegraph systems, separate relays arranged to respond differently to the modified code impulses, a type-carrier, a series of adjusters for said type-carrier, a series of actuating-magnets for said adjusters, a series of supplemental magnets controlling the energizing-circuits of said adjusting-magnets and separate sets of contacts for controlling the circuits of said supplemental magnets, said sets of contacts being respectively controlled by said separate relays.

10. In automatic telegraphs, separate relays relatively quick and slow acting to respond differently to the variably-timed impulses of the signal-code, a type-carrier, a series of adjusters for variably shifting said carrier, a series of actuating-magnets therefor, a series of supplemental magnets controlling the energizing-circuits of said adjusting-magnets and separate sets of contacts controlling the circuits of said supplemental magnets, said sets of contacts being respectively controlled by said separate relays.

11. In automatic telegraph systems, separate relays arranged to respond differently to the modified code impulses, a type-carrier and means for variably shifting said type-carrier controlled by the combined operation of said separate relays and acting in response to the varied order of the different code combinations.

12. In automatic telegraphs, a type-carrier, a shifter for variably moving said carrier, a series of adjusters having varied, lost-motion connections with said shifter and a series of actuating-magnets for said adjusters.

13. In automatic telegraphs, a type-carrier, a shaft connected to shift said carrier, a shifter connected to said shaft for variably rotating the same, a series of adjusters connected to said shifter and arranged to impart different extents of movement to the same and a series of operating-magnets for said adjusters.

14. In automatic telegraphs, a type-carrier, a shaft connected to shift said carrier, a sliding collar keyed to said shaft, a lug adjacent said shaft and having a stepped slot-and-pin connection with said collar, a shifter for one of said connected members, a series of adjusters having varied lost-motion connections with said shifter and a series of actuating-magnets for said adjusters.

15. In automatic telegraphs, a type-carrier, a shaft connected to shift said carrier, a sliding collar keyed to said shaft, a lug adjacent said shaft and having a spiral, stepped slot, a pin on said collar engaging said slot, a shift-lever for said collar, a link connected to said shifter, a series of adjusters having varied lost-motion connections with said link and a series of actuating-magnets for said adjusters.

16. In automatic telegraph systems, a single line-circuit, separate relays controlled by said line-circuit, arranged to be traversed by all impulses received and to respond differently to the modified code impulses, a type-carrier and separate shifters for variably moving said carrier directly and respectively operated by said separate relays.

17. In automatic telegraphs, separate relays relatively quick and slow acting and arranged to respond differently to the variably-timed code impulses, a type-carrier and shifter mechanism controlled by the combined operation of said relays for variably moving said type-carrier in correspondence with the combination of impulses received.

18. In automatic telegraph systems, a single line-circuit, separate relays controlled by said line-circuit, arranged to be traversed by all impulses received and to respond differently to the modified impulses of the signal code, a type-carrier and separate shifters actuated directly and respectively by said separate relays for variably moving said carrier in different directions at an angle to each other.

19. In automatic telegraphs, a single line-circuit, separate relays controlled by said line-circuit, arranged to be traversed by all impulses received and to respond differently to the modified impulses of the signal-code, a type-carrier, separate shifters for said type-carrier actuated by said separate relays and means controlled by one of said magnets for preventing the operation of the shifter of the other of said magnets.

20. In automatic telegraphs, a single line-circuit, separate relays controlled by said line-circuit, arranged to be traversed by all impulses received and to respond differently to the variably-timed impulses of the code, a type-carrier, separate shifters for said carrier operated by said separate relays and a lock for the shifter of said quick-acting magnet controlled by said slow-acting magnet.

21. In automatic telegraphs, a single line-circuit, separate relays controlled by said line-circuit, arranged to be traversed by all impulses received and to respond differently to the modified impulses of the signal-code, a type-wheel and separate shifters arranged to effect respectively the rotation and the axial movement of said type-wheel, said separate shifters being directly operated by said separate relays.

22. In automatic telegraphs, a single line-circuit, separate relays controlled by said line-circuit, arranged to be traversed by all impulses received and to respond differently to the variably-timed impulses of the signal-code, a type-wheel, separate shifters for respectively effecting the rotation and the axial movement of said type-wheel, said separate shifters being respectively controlled by said separate relays and a magnetic lock for the shifter of said quick-acting magnet, the circuit of which is controlled by said slow-acting magnet.

23. In automatic telegraphs, a type-wheel, springs for respectively rotating and axially moving said wheel, escapement wheels and anchors connected to said type-wheel and cooperating with said springs and separate relays arranged to be traversed by all impulses received and to respond differently to the modified code impulses for directly operating said escapement-anchors.

24. In automatic telegraphs, a type-wheel, springs for respectively rotating and axially moving said wheel, escapement wheels and anchors connected to said type-wheel and cooperating with said springs, separate relays relatively quick and slow acting to respond differently to the variably-timed impulses of the signal-code, said quick-acting shifter having a spring-held spacing-dog and a lock for said spacing-dog controlled by said slow-acting relay.

25. In automatic telegraphs, a type-wheel, springs for respectively rotating and axially moving said wheel, escapement wheels and anchors connected to said type-wheel and co-operating with said springs, the normally engaged dog of each of said anchor escapements being pivoted and spring-held, separate relays for actuating said escapement-anchors and means for returning said type-wheel to normal position against the tension of said springs.

26. In telegraph systems in which the characters are represented by different numbers of successive modified impulses, a type-carrier, separate shifters for variably moving said carrier in response to the varying number of modified code impulses and a series of adjusters for variably shifting said type-carrier in response to the varying order of the impulses.

27. In automatic telegraphs, a type-carrier on which the characters are divided into separate groups, means for variably shifting the type-carrier in response to the varying number of modified code impulses to select a particular group and means for further shifting the type-carrier in response to the varying order of the impulses for bringing a particular character of the selected group to the printing-point.

28. In automatic telegraphs, a type-carrier, separate relays, separate shifter mechanisms for said type-carrier respectively controlled by said separate relays and a third shifter mechanism for said type-carrier controlled by the combined operation of said relays.

29. In automatic telegraph systems, a single line-circuit, separate relays controlled by said line-circuit, arranged to be traversed by all impulses received and to respond differently to the modified impulses of the signal-code, a type-carrier, separate shifter mechanisms for said type-carrier controlled respectively by said separate relays and a third, simultaneously-operating shifter mechanism for said type-carrier controlled by the combined operation of said relays.

30. In automatic telegraphs, a type-carrier, separate relays, separate shifters controlled respectively by said separate relays for variably actuating said type-carrier, a series of adjusters for further and simultaneously variably moving said type-carrier and a series of actuating-magnets for said adjusters, the energizing-circuits of said adjusting-magnets being controlled by the combined operation of said relays.

31. In automatic telegraph systems, a single line-circuit, separate relays relatively quick and slow acting to respond differently to the variably-timed impulses of the code, a type-carrier, separate shifters for said type-carrier controlled respectively by said separate relays, a series of adjusters for simultaneously shifting said type-carrier, a series of operating-magnets for said adjusters and means controlled by the combined operation of said relays for energizing said adjusting-magnets.

32. In automatic telegraphs, a type-carrier, separate shifter mechanisms for said type-carrier, separate relays for respectively controlling said shifter mechanisms and a third shifter mechanism controlled by the combined operation of said relays for variably adjusting said type-carrier relatively to one of said first-mentioned shifter mechanisms.

33. In automatic telegraphs, a type-carrier, separate shifter mechanisms for said type-carrier, separate relays for respectively controlling said shifter mechanisms, a series of adjusters for variably adjusting the position of said type-carrier relatively to one of said shifter mechanisms and a series of actuating-magnets for said adjusters, the energizing-circuits of said magnets being controlled by the combined operation of said relays.

34. In automatic telegraphs, a type-carrier, a shifter for said type-carrier, a lever for variably adjusting the position of said type-carrier relatively to said shifter, a series of adjusters arranged to impart a variable movement to said lever and a series of operating-magnets for said adjusters.

35. In automatic telegraphs, a type-carrier, a rotatable shaft connected to shift said type-carrier, an escapement wheel and anchor for rotating said shaft, said escapement-wheel being mounted on said shaft, a collar keyed to said shaft, a lug fixed to said escapement-wheel and having a stepped slot-and-pin connection with said collar, a shifter for one of said connected members, a series of adjusters for said shifter and a series of actuating-magnets for adjusters.

36. In automatic telegraphs, a type-carrier, separate shifters for variably moving said type-carrier in different directions, separate relays for respectively controlling said shifters, a third shifter for variably adjusting the position of said type-carrier relatively to one of said first-mentioned shifters, a series of adjusters for actuating said third shifter, a series of operating-magnets for said adjusters and means controlled by the operation of said relays for energizing said adjusting-magnets.

37. In automatic telegraphs, a type-wheel, springs for rotating and axially moving said wheel, escapement-wheels and anchors coöperating with each of said springs, shafts whereon said escapement-wheels are mounted connected to said type-wheel, a sliding collar keyed to one of said shafts, a lug fixed to the escapement-wheel on said shaft and having a stepped slot, a pin on said collar engaging said slot, a shift-lever for said collar, a link connected to said shift-lever and a series of adjusters having varied lost-motion connections with said link.

38. In automatic telegraphs, a type-carrier, separate shifters for variably moving said type-carrier in different directions, separate restoring devices for said type-carrier, circuits controlling the operation of said restoring devices and separate sets of contacts interposed in said circuits and controlled respectively by said separate shifters.

39. In automatic telegraphs, a type-carrier, a shifter for variably moving said type-carrier from normal, a restoring device for said type-carrier, a controlling-magnet therefor, contacts interposed in the energizing-circuit of said magnet and controlled by the movement of said shifter, means for closing the energizing-circuit of said magnet and for maintaining the same in closed condition until said type-carrier has returned to normal.

40. In automatic telegraphs, a type-carrier, an escapement mechanism for variably moving said type-carrier from normal, a restoring device for said type-carrier, a controlling-magnet for said restoring device, contacts controlled by the movement of said escapement interposed in the energizing-circuit of said magnet, a circuit-closer for said energizing-circuit, an operating-magnet for said circuit-closer and a shunt arranged to be closed by the operation of said magnet through the coil thereof to lock the restoring-circuit in closed condition.

41. In automatic telegraph systems, a single line-circuit, a line-relay, separate relays controlled by said line-relay and relatively quick and slow acting to respond differently to the variably-timed impulses of the signal-code, a type-carrier and separate shifters controlled respectively by said quick and slow acting relays for variably shifting said type-carrier.

42. In automatic telegraph systems, a quick-acting polarized relay and a relatively-slow-acting relay, a type-carrier, shifters for said type-carrier respectively controlled by said relays, a single line-circuit and a line-relay arranged to reverse the circuit through said quick-acting polarized relay and to open and close the circuit through said relatively-slow-acting relay.

43. In automatic telegraph systems in which the characters are represented by different numbers of modified code impulses, a type-carrier, means acting in response to the varied combination of code impulses for variably shifting said type-carrier, a printing-hammer coöperating with said type-carrier, an operating-circuit therefor, and electrical means controlled by the combinations of impulses received and arranged to prevent the completion of said hammer-actuating circuit, except at the pauses between completed code combinations.

44. In automatic telegraph systems in which the characters are represented by different numbers of modified code impulses, a type-carrier, separate electrical devices acting in response to the varied combinations of code impulses transmitted over the line-circuit for variably shifting said type-carrier, a printing-hammer coöperating with said type-carrier, an operating-circuit therefor and electrical means arranged to be traversed by all impulses received and to close said hammer-actuating circuit at the pauses between completed code combinations.

45. In automatic telegraph systems, a single line-circuit, a line-relay, a type-carrier, separate relays controlled by said line-relay and arranged to variably shift said type-carrier, a printing-hammer coöperating with said type-carrier, an operating-circuit therefor, a controller for said circuit and an operating-magnet, the energizing-circuit of which is controlled by the vibrations of the armature of said line-relay, arranged to actuate said circuit-closer at the pauses between completed code combinations.

46. In automatic telegraphs, a type-carrier, shifter mechanism for said type-carrier acting in response to the varied combinations of code impulses, a printing-hammer coöperating with said type-carrier, an actuating-magnet therefor, a circuit-closer for the energizing-circuit of said hammer-actuating magnet and a slow-acting magnet normally on a closed circuit and arranged to be traversed by all impulses received and to actuate said circuit-closer at the pauses between completed code combinations.

47. In automatic telegraphs, a type-carrier, shifter mechanism therefor, a single line-relay controlling said shifter mechanism, a printing-hammer, an actuating-magnet therefor, a circuit-closer interposed in the energizing-circuit of said hammer-actuating magnet, a relatively-slow-acting magnet normally on a closed circuit for operating said circuit-closer and means for opening and closing the energizing-circuit of said slow-acting magnet controlled by said line-relay.

48. In automatic telegraphs, a type-carrier, shifter mechanism therefor, a printing-hammer, an actuating-magnet for said printing-hammer, a circuit-controller for the energizing-circuit of said magnet, a locking-arm for holding said controller in closed position, an actuating-magnet for said circuit-controller and means controlled by said magnet for releasing said locking-arm.

49. In automatic telegraphs, a type-carrier, shifter mechanism therefor, a printing-hammer, an operating-circuit for said hammer, a slow-acting magnet for controlling said circuit, said magnet being normally on a closed circuit and arranged to be traversed by all impulses received and to draw up its armature at the pauses between completed code combinations and a contact-arm coöperating with, but normally insulated from said armature, the latter being arranged to make and break contact with said arm when drawn up by said magnet.

50. In automatic telegraphs, a type-carrier, shifter mechanism therefor, a printing-hammer coöperating with said type-carrier, an operating-circuit for said hammer, a controlling-magnet for said circuit, the coil of said magnet being normally on a closed choked circuit and arranged to be traversed by all impulses received and to draw up its armature at the pauses between completed signals, a locking contact-arm coöperating with, but normally insulated from the armature of said magnet, said armature being arranged to make contact with said arm when drawn up by said magnet and means controlled by said magnet for releasing said contact locking-arm to break the circuit and permit the return of the armature to normal position.

51. In automatic telegraph systems in which the characters are represented by different numbers of modified code impulses, a type-carrier, shifter mechanism acting in response to the varied combinations of code impulses for variably moving said type-carrier, a printing-hammer coöperating with said type-carrier, an operating-circuit therefor, an electrical device for controlling said circuit arranged to be traversed by all impulses received and a choking-coil in the energizing-circuit of said electrical device, whereby the hammer-actuating circuit is only closed at the pauses between completed code combinations.

52. In automatic telegraphs, a type-carrier, shifter mechanism therefor, a printing-hammer and a restoring device coöperating with said type-carrier, operating magnets and circuits for said hammer and said restoring device, a restoring-circuit controller and a controller for the hammer-actuating circuit arranged to be traversed by all impulses received and to close the circuit through said hammer-actuating magnet and through said restoring-circuit controller at the pauses between completed combinations.

53. In automatic telegraphs, a type-carrier, shifter mechanism therefor, a printing-hammer and a restoring device coöperating with said type-carrier, operating magnets and circuits for said hammer and said restoring device, a controller for said restoring-circuit, a magnet having its coil in a normally closed, choked circuit, arranged to be traversed by all impulses received and to draw up its armature at the pauses between completed code combinations and a locking contact-arm controlled by said restoring-circuit closer and coöperating with, but normally insulated from the armature of said magnet, said armature being arranged to contact with said locking-arm as it is drawn up by said magnet to close the circuit through said hammer-actuating magnet and through said restoring-circuit controller.

54. In automatic telegraphs, a single line-circuit, a type-carrier, means acting in response to the varied combinations of code impulses transmitted over said line-circuit for variably shifting said type-carrier, a printing-hammer coöperating with said type-carrier, a paper-carriage, a letter-space feed therefor, actuating-magnets for said hammer and said letter-space feed, and means controlled by the line-circuit and operating at the pauses between completed code combinations for closing the energizing-circuits of said magnets, the position on said type-carrier corresponding to a special, spacing-signal being blank.

55. In automatic telegraphs, a type-carrier, shifter mechanism therefor, a paper-carriage, letter-space mechanism therefor, a printing-hammer coöperating with said type-carriage, actuating-magnets for said printing-hammer and said letter-space mechanism and a switch controlling the energizing-circuit of said letter-space magnet, said switch being arranged to be shifted in opposite directions by the armatures of said magnets.

56. In automatic telegraphs, a type-carrier, shifter mechanism for variably moving said type-carrier, a paper-carriage, a letter-space mechanism therefor, a printing-hammer coöperating with said type-carrier, actuating-magnets for said hammer and said line-space mechanism, a longitudinally-shiftable switch-bar controlling the energizing-circuit of said letter-space magnet, the armatures of said magnets being arranged to shift said bar in opposite directions and means for holding said bar in either of its shifted positions.

57. In automatic telegraphs, a single line-circuit, printing mechanism controlled by said line-circuit, a reciprocating paper-carriage provided with a letter-space rack, a spring-drum connected to said paper-carriage, a vibrating spacing-arm, a feed-pawl pivoted on said arm and arranged to engage said rack to propel the carriage against the pull of said spring-drum, an actuating-magnet for said vibrating arm, a retaining-pawl normally engaging said rack, means for locking said drive-pawl into engagement with said rack at the end of its letter-space movement and means acting at the pauses between completed signals for energizing said magnet.

58. In automatic telegraphs, a line-circuit, a type-carrier, means controlled by said line-circuit for variably shifting said type-carrier, a reciprocating paper-carriage, a letter-space feed for said carriage, means for returning the same to its starting-point, a local circuit controlling said means and coöperating contacts for controlling said local circuit, one of said contacts being mounted on said type-carrier and arranged to engage the other of said contacts in response to the transmission of a special signal over the line.

59. In automatic telegraphs, a single line-circuit, printing mechanism controlled by said line-circuit, a reciprocating paper-carriage, a spring-drum connected to said carriage, a letter-space rack on said carriage, a feed-pawl and a retaining-pawl coöperating with said rack, a release for said retaining-pawl, stops on said carriage for mechanically shifting said release, an actuating-magnet for said release and means acting in response to the transmission of a special signal over the line for energizing said magnet.

60. In automatic telegraphs, a single line-circuit, a type-carrier, means controlled by said line-circuit for variably shifting said type-carrier, a reciprocating paper-carriage, a line-space feed therefor, a local circuit controlling said line-space feed and coöperating contacts for controlling said circuit, one of said contacts being mounted on said type-carrier and arranged to engage the other of said contacts in response to the transmission of a special signal over the line.

61. In automatic telegraphs, a line-circuit, a type-carrier, means controlled by said line-circuit for variably shifting said type-carrier, a reciprocating paper-carriage, a letter-space feed for said carriage, means for returning the same to its starting-point, a line-space feed for said paper-carriage, local circuits controlling said return-effecting means and said line-space feed and coöperating contacts for controlling said circuits, one contact of each pair being mounted on said type-carrier and arranged to engage the other contacts in response to the transmission of special signals over the line, the corresponding positions on said type-carrier being blank.

62. In automatic telegraphs, a line-circuit, printing mechanism controlled by said line-circuit, a reciprocating paper-carriage having a letter-space rack, a spring-drum connected to said carriage, a drive-pawl and a retaining-pawl coöperating with said rack, a release for said retaining-pawl to permit the return of the carriage to its starting-point, means for actuating said release, a line-space feed, a local circuit controlling said line-space feed, normally opened contacts interposed in said circuit and controlled by said carriage-release and a stop on said carriage for returning said carriage-release device to normal position.

63. In automatic telegraphs, a line-circuit, printing mechanism controlled by said line-circuit, a reciprocating paper-carriage, a stationary and a rotatable guide-rod whereon said paper-carriage is mounted, a paper supporting and feed roller keyed to said rotatable guide-rod but connected to shift with said carriage, line-space-feed mechanism mounted upon said rotatable guide-rod, an actuating-magnet therefor and means for controlling the energizing-circuit of said magnet.

64. In automatic telegraphs, a line-circuit, a type-wheel, means controlled by said line-circuit for variably shifting said type-wheel, means for guiding an inking-ribbon over said type-wheel, separate spools whereon the opposite ends of the ribbon are wound, a printing-hammer coöperating with said type-wheel, an actuating-magnet therefor, a drive-shaft, means controlled by said magnet for rotating said drive-shaft, a shiftable support whereon said ribbon-spools are mounted for throwing either of said spools into gear with said drive-shaft and means operating at the pauses between completed code combinations for energizing said magne.

ALFRED C. GILMORE.

Witnesses:
ALBERTA ADAMICK,
LILLIAN PRENTICE.